United States Patent [19]

Powers

[11] 3,972,279
[45] Aug. 3, 1976

[54] FREEZING, DEFROSTING AND STORAGE ASSEMBLY

[75] Inventor: Gilbert L. Powers, South Pasadena, Calif.

[73] Assignee: W. B. Van Nest Company, Excelsior, Minn.

[22] Filed: Feb. 11, 1974

[21] Appl. No.: 441,030

[52] U.S. Cl. .................................... 99/516; 62/64; 62/373; 99/467; 99/470; 99/483; 99/517; 165/61
[51] Int. Cl.² ................................................ A23B 4/06
[58] Field of Search ............. 9/453, 455, 646, 485, 9/483, 470, 467, 516, 517, 534, 532, 535, 536; 52/263, 79; 62/64, 373; 426/524; 165/61; 134/170, 106 R; 68/189

[56] References Cited
UNITED STATES PATENTS

| | | |
|---|---|---|
| 1,850,031 | 3/1932 | Rayson .................................. 99/470 |
| 1,973,953 | 9/1934 | Gordon, Jr. ......................... 68/189 X |
| 2,231,886 | 2/1941 | Crider .................................... 62/64 |
| 3,422,582 | 1/1969 | VanDerLely ........................... 52/79 |
| 3,459,013 | 8/1969 | Renaud ............................. 68/189 X |
| 3,581,528 | 6/1971 | Mortensen ........................... 68/189 |
| 3,623,892 | 11/1971 | Koonz ................................. 426/524 |

*Primary Examiner*—Billy J. Wilhite
*Assistant Examiner*—James A. Niegowski
*Attorney, Agent, or Firm*—Schroeder, Siegfried, Ryan & Vidas

[57] ABSTRACT

A freezing, defrosting and storage assembly for meat products and particularly turkeys is provided wherein a pallet having a plurality of vertically projecting spaced tubes supports the product during freezing and storage and operates during the defrosting period by passage of a defrosting fluid through the tubes and outwardly over the surface of the product to be thawed in a thin film.

7 Claims, 5 Drawing Figures

FREEZING, DEFROSTING AND STORAGE ASSEMBLY

The present invention is directed to the field of frozen food and is more particularly concerned with the art of frozen meats. More particularly, the present invention is directed to an apparatus useful in the freezing, storage and defrosting of frozen meats and still more particularly to avians such as turkeys.

Reference is hereby made to the disclosure contained in my patent application filed of even date herewith entitled DEFROSTING APPARATUS AND METHOD Ser. No. 441,663 filed Feb. 11, 1974 and now abandoned. in the copending patent application, there is set forth an apparatus and method for the defrosting of already frozen food products and in particular frozen turkeys. The invention set forth in the referred to copending patent application is for apparatus that is useful principally in the thawing of frozen food products. The present invention is directed to all three stages of freezing of the product, storage of the product, and ultimate thawing for further processing.

While the present invention will be useful for a variety of products, it is anticipated that its principal use will be with regard to avians and in particular with regard to turkeys. It will thus be described with particularity in this particular application.

The majority of turkeys are frozen after the slaughtering operation. The slaughtering operation includes the killing, eviscerating and removal of feathers on the bird. After freezing of the turkey, the turkey is placed in a cold storage warehouse until it is desired to further process the bird. At such a later date the turkey must first be thawed before the additional processing can take place. During each of the enumerated stages a number of conditions must be observed. The freezing, storage and thawing operations must all be such as to observe cleanliness in keeping foreign materials away from the turkeys. The cost of such operations must be kept at a minimum. Likewise, the time involved in the freezing and thawing operations should be kept at a minimum so as to lessen bacterial activity from reducing the quality of the meat in the turkey.

The thawing operation is particularly susceptible to deterioration of the quality of meat in the turkey. As it is desirable to thaw the birds as rapidly as possible, a relatively high temperature environment would appear to be dictated so as to speed up the rate of thawing. Unfortunately, the higher the temperature in the environment of thawing the more rapid is bacterial action. Therefore, it is desirable to minimize the temperature utilized in the thawing operation so as to lessen such bacterial activity.

In accordance with the present invention, a special apparatus is provided which is effective in all three stages of handling of the turkey carcass. The assembly is utilized in the freezing operation, following which the assembly and birds contained thereon are moved to the cold storage warehouse. At such future time as it is desired to thaw the birds, the entire assembly holding the birds is utilized in achieving a rapid and yet low temperature thawing of the carcasses. This is all accomplished in accordance with the invention by utilizing a pallet having a plurality of upstanding tubular members upon which the carcasses are impaled through the body cavity following which high speed, low temperature freezing is accomplished. The pallet and tube assembly is then enclosed, preferably in a relatively thin plastic envelope, and placed into storage.

At such time as it is desired to thaw the birds, the tubes upon which the birds are impaled are connected to a source of a thawing fluid which is pumped through the tubes and exits from a plurality of small openings in the tubes to form a thin flowing film of thawing liquid over the outer and inner surfaces of the carcass thus bringing about the desired thawing. As the film is a flowing one, the efficiency of the operation is better than is the case where the birds are totally immersed in a tank of liquid as has been commonly done in the past. Likewise, the cleanliness of the operation is considerably enhanced as the birds are not exposed to the outer environment either during the storage period or at the time they are thawed. A drain means in the bottom of the pallet permits collection of the thawing liquid for recycling through a heat exchanger and filter apparatus before being returned to continue the thawing operation.

The invention will be described in detail with regard to the following drawings.

IN THE DRAWINGS

Figure 1:
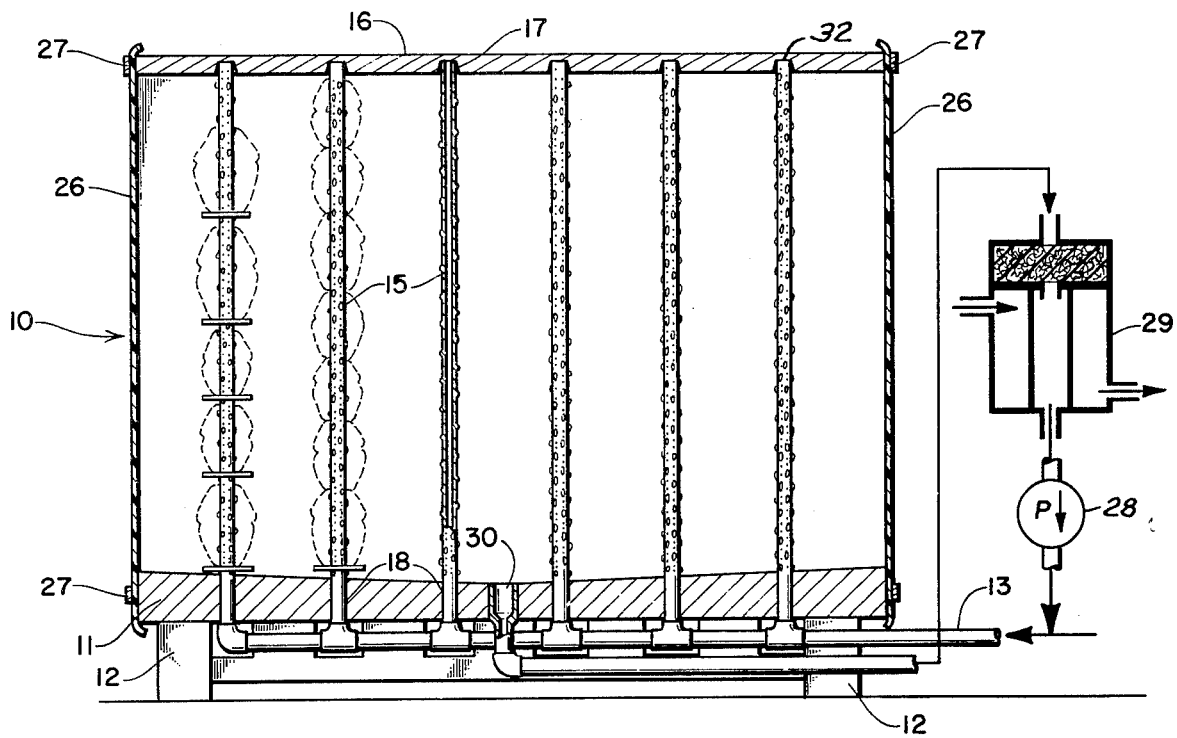
FIG. 1 is a cross-sectional elevational view of an assembly in accordance with the invention and includes a diagrammatic representation of a recycling system for the thawing fluid.
Figure 2:
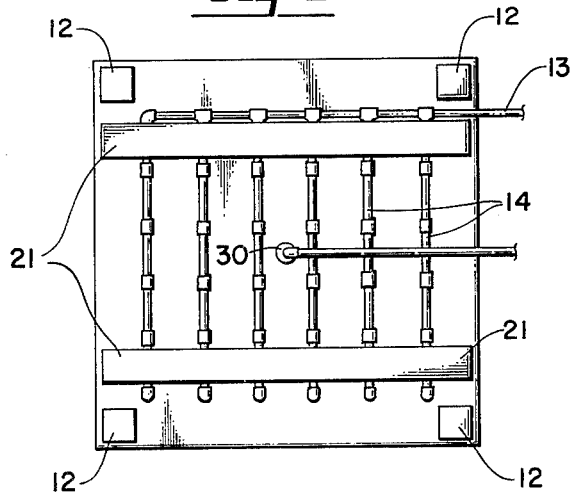
FIG. 2 is a bottom view of the pallet of FIG. 1 showing a manifold arrangement for introduction of fluid into the tube portions of the assembly.
Figure 3:
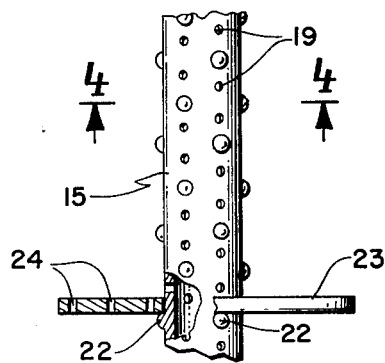
FIG. 3 is a fragmentary enlarged view of a section of a support tube.

Turning now to the drawings, like parts will be given the same numerical designation in the several drawings. Referring first to FIG. 1, there is seen in cross-sectional view an assembly in accordance with the invention generally designated 10. The assembly consists of a lower pallet member 11 which may be supported by legs 12 in a raised position above a floor. Pallet member 11 is provided with a sloped upper surface which terminates at a centrally positioned drain 30. Supported from the lower surface of pallet 11 is a main manifold pipe 13 which is in fluid connection with a series of feeder lines 14 which extend along the length of pallet 11. Where it is desired to use fork lift equipment in the movement of the pallet, cross beams 21 may be attached to the lower side of pallet 11 with appropriate recesses being provided therein to shield pipes 13 and 14 from contact with beams 21.

Pallet 11 is provided with a plurality of openings extending perpendicularly therethrough through which extend a plurality of pipes 15 arranged in rows along the lengths of and in fluid communication with feeder lines 14. Pipe members 15 are desirably firmly supported by pallet 11 so as to lend rigidity to their upright position. Pipes 15 are of a diameter such that they will readily pass through the neck and rear openings in an eviscerated carcass and provide a support for the same.

Figure 4:
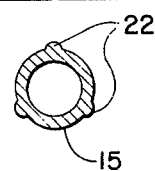
FIG. 4 is a top cross-sectional view along lines 4—4 of FIG. 3.
Figure 5:
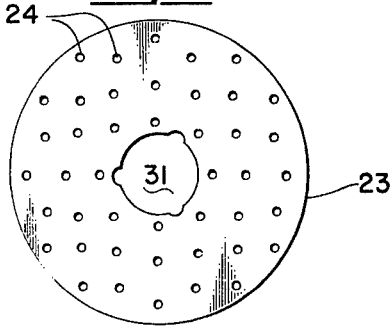
FIG. 5 is a top view of a support disc in accordance with the invention.

Pipes 15 are also provided with a plurality of openings 19 extending therethrough for purposes which will be explained hereinbelow. In most operations utilizing the invention, it is contemplated that the turkeys will be stacked as shown schematically on the righthand side of FIG. 1. That is, the turkeys are consecutively mounted on pipes 15 and rest directly on the underlying bird. This maximizes use of space in the apparatus. As an alternative form, pipes 15 may be provided with projections 22 which may be conveniently spaced in a 120° separation around the pipe 15 as is best seen in FIG. 4. This construction is for use where the turkeys are to be spaced from one another during freezing and storage.

Disc members 23 provided with a triangularly shaped opening 31 in the center thereof are removably positionable on pipes 15 and by rotation rest and are supported by projections 22. Note that the projections 22 are of a size that they do not obstruct impaling of turkeys on pipes 15. The functions of discs 23 are best seen in FIG. 1 wherein a dotted outline of turkeys supported on a tube 15 and also supported by a disc 23 is diagrammatically illustrated at the lefthand side of the figure. While spacing of the birds in this manner is not mandatory, it tends to improve the effectiveness of the thawing operation and further prevents the freezing of birds to one another.

A top closure member 16 is provided which has a plurality of recessed openings 32 in the lower side thereof. The openings 32 are positioned to correspond to the tops of tubes 15 and member 16 is supported by these tubes. Lid member 16 is of a thickness such that pallet assemblies may be stacked on top of one another for the conservation of warehouse space. Alternatively, when such stacking is not desired, member 16 may be relatively thin and lightweight.

The operation of the assembly in accordance with the invention is as follows. A pallet member 11 having rods 15 projecting upwardly therefrom is utilized in stacking freshly slaughtered and eviscerated birds thereon in either manner illustrated in FIG. 1. In the first instance, the birds are impaled through the rear opening and neck opening with consecutive birds resting directly upon one another. In the alternative form, the bird is impaled through the rear opening and neck opening onto member 15 and rests upon a disc 23. As each bird is placed in position, a disc 23 is positioned onto the next elevated position along rod 15 and a bird is then placed so as to be supported by the disc 23. The support members 22 for disc 23 have been drawn somewhat exaggerated for purposes of clarity of understanding and may be relatively minor projections from rod 15 to simplify passage of the rod through the bird.

Once a pallet has been completely loaded with birds to be frozen the assembly may be then placed into a room or chamber at low temperature and having rapid movement of air therethrough so as to quickly freeze the birds in position on the pallet. It is also contemplated that the tube members 15 may be joined to a source of cold fluid for speeding the freezing operation by directing the cold fluid on the inside of the body cavity.

Lid member 16 is then placed into position and a plastic sleeve 26 is positioned around the outer edges of the entire assembly. Sleeve member 26 may conveniently be a thin polyethylene material or other similar plastic material. Sleeve 26 may be held in place by means of metal strap bands 27 tied around the lower pallet 11 and lid member 16 or where desired heat may be used to heat shrink the upper and lower edges of sleeve 26 onto the surfaces of pallet 11 and lid member 16. The assembly is then ready for extended storage.

The plastic sleeve insures cleanliness throughout the storage period and will also prevent moisture loss and potential freezer burn of the frozen turkeys.

As already noted, the pallets may be stacked on top of one another to conserve storage space in the warehouse. When it is desired to use a fork lift truck, some means such as cross supports 21 may be utilized to protect pipes 13 and 14 from damage by the fork lift during the lifting operation.

When it is desired to thaw the product contained within assembly 10, manifold pipe 13 is joined to a source of fluid such as water. The water is pumped through tube 13 and feeder lines 14 and thence up through each of tubes 15 where it is ejected outwardly therefrom through openings 19. As is set forth in my copending application filed of even date herewith, it is desirable to maintain the temperatures utilized in thawing at as low a point as is feasible, taking into account the need to achieve reasonably rapid thawing of the bird. It has been found that if a temperature of less than 50°F is maintained for the heat exchange liquid used in thawing the bird that the amount of bacterial action during the thawing operation is markedly lessened over that that will take place when higher temperatures are utilized. Preferably, the temperature of the incoming liquid should be below 45°F during the initial stage of thawing. Sufficient pressure is applied to the thawing fluid to insure a steady spray of liquid down over the outer portions of the bird as well as onto the inner cavity so that a generally steady and thin film of moving liquid passes over each bird. The rate of flow of liquid is maintained at a sufficient level so that the immediate surface of the bird is maintained at a temperature closely approximating that of the inflowing liquid. Greater volumes of liquid are unnecessary as they have little effect on the thawing of the bird. Likewise, the excess flow necessitates handling of greater quantities of liquid.

As the liquid flows down over the birds and over each successive bird, it collects at the base of pallet 11 at drain 30. The floor of the chamber (the upper surface of pallet 11) is sloped so that all of the liquid within the confined chamber defined by the lid 16, pallet 11 and plastic sleeve 26 collects at drain 30.

As illustrated in FIG. 1 in schematic form, the liquid collecting at drain 30 is preferably recycled by means of a pump 28 through a combined filter and heat exchanger 29 following which it is cycled back through the thawing system. Any solid materials which become entrained in the liquid will be removed by the filter and the heat exchanger raises the temperature of the liquid back to the desired input temperature. This recycling is continued for a period of time sufficient to largely defrost the turkeys. The time required will, of course, be empirically determined based upon the initial temperature of the birds, the size of the bird—i.e., the cross-sectional thickness—and upon the input temperature of the thawing fluid. It will be appreciated that due to the fact that the liquid is injected both internally and externally to the bird that the time required for thawing is considerably lessened over that where the heat exchange is essentially solely through the outer surface.

As the bird approaches a complete thawing, the temperature of the input liquid is reduced to a lower temperature of about 40°F. The purpose in lowering the temperature is to further minimize the amount of bacterial activity taking place in the carcass of the bird by lowering the outer skin and internal cavity temperature. The remaining frozen portions of the bird will become thawed by absorption of heat from the already thawed portions of the bird thereby lowering the temperature of the previously thawed portions so that the ultimate result is that the entire bird will be at a temperature close to the freezing temperature and yet be completely thawed.

Once the birds have been thawed, any residual liquid remaining in the assembly is removed. The pallet may be then moved to a separate operating station as desired while still being in a condition such that the thawed birds are isolated from the external environment by the chamber defined by lid 16, pallet 11, and plastic walls 26.

It should be appreciated that as the outer walls 26 do not provide a support function they may be of very thin material and can conveniently also be transparent. This allows at least a limited visual inspection of the product contained therein during the storage or processing period.

What is claimed is:

1. A freezing, defrosting and storage assembly for perishable meat products comprising a movable pallet, said pallet including a drain means therein with the upper surface of said pallet being sloped to said drain means, a plurality of spaced tube members of substantially equal length joined to and extending upwardly from said pallet, said tube members having a diameter such that the tube will pass longitudinally through the body cavity of an eviscerated avian, each of said tube members defining a plurality of openings along the length and spaced around the circumference thereof, means for introducing a fluid into each of said tube members under pressure so that said fluid will flow outwardly through said openings and over the internal and external surface of a fowl when mounted on said tube, a lid member adapted to be positioned in spaced relationship above said pallet by support means extending upwardly from said pallet, and fluid-tight chamber forming means extending around the periphery of and joining said lid member and said pallet.

2. An assembly in accordance with claim 1 wherein said support means are said tube members.

3. An assembly in accordance with claim 1 wherein liquid-tight wall members are joined to and extend upwardly from said pallet to said lid member and are joined to said lid member and are supported thereby.

4. An assembly in accordance with claim 1 wherein said tube members include removable and adjustable spacing means for mounting avians thereon in spaced relationship to one another.

5. An assembly in accordance with claim 4 wherein said spacing means include projections extending at spaced intervals from the outer wall portion of said tube members, said projections constructed and arranged to support an avian spacing and support disc.

6. An assembly in accordance with claim 1 wherein said chamber forming means is a sheet of plastic in sleeve form.

7. An assembly in accordance with claim 6 wherein said plastic is a thin film of polyethylene.

* * * * *